Patented Nov. 15, 1927.

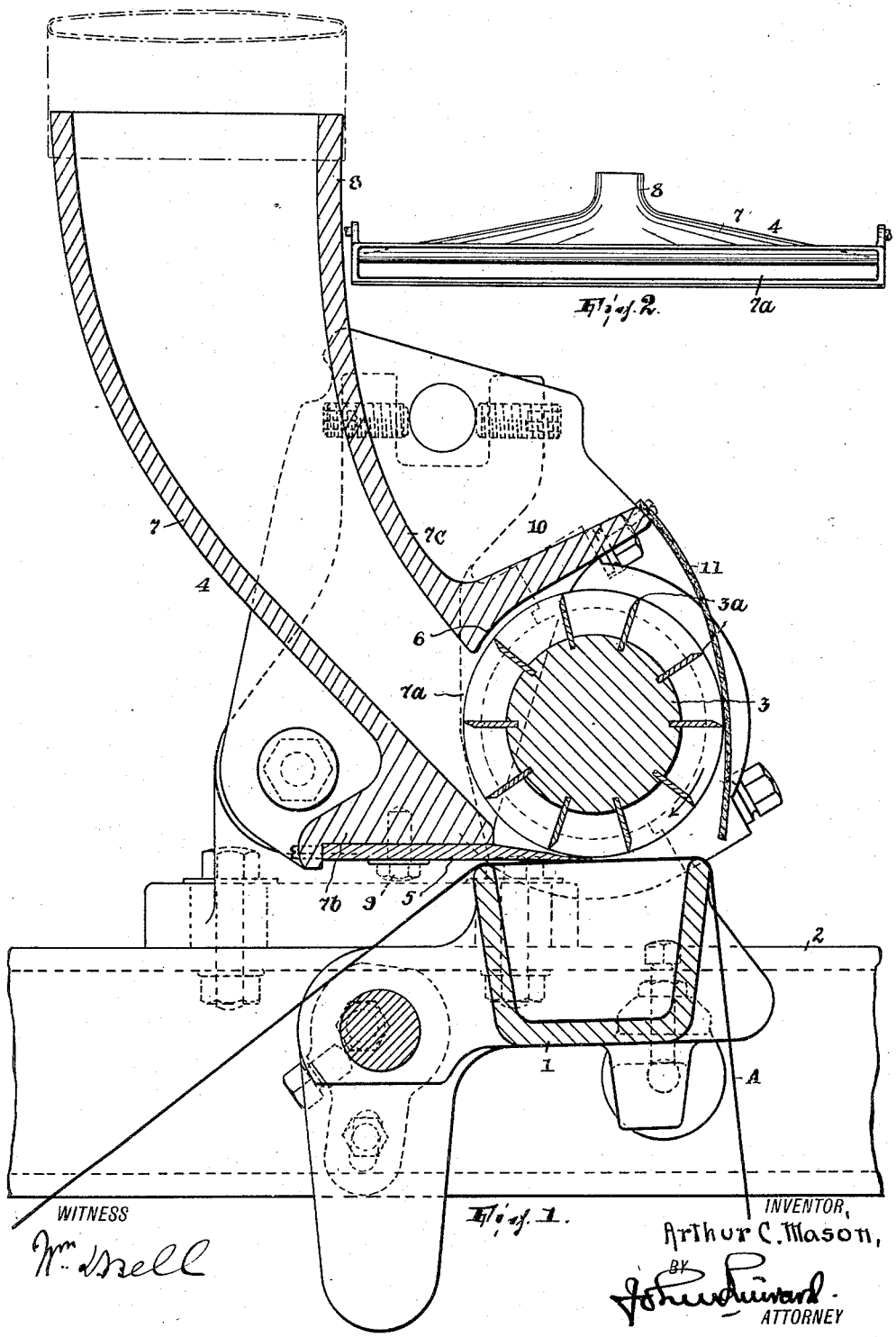

1,649,172

UNITED STATES PATENT OFFICE.

ARTHUR C. MASON, OF HAWTHORNE, NEW JERSEY.

FABRIC-SHEARING MECHANISM.

Application filed January 2, 1926. Serial No. 78,779.

This invention relates to mechanism for shearing cloth of the class in which a rotary cutter cooperates with a ledger blade in the shearing and the ledger blade forms in effect one side or lip of the intake mouth of a suction nozzle which is connected with a suitable source of suction and serves to remove the fluff or cuttings from the cutting line between the rotary cutter and ledger blade. The object of the invention is to increase the efficiency of mechanism of this class in certain respects which will hereinafter appear.

In the drawing,

Fig. 1 shows a vertical sectional view of the improved mechanism; and

Fig. 2 is an elevation of the nozzle looking toward its mouth.

1 is a channeled cloth support over which extends the cloth A which is to be subjected to the operation of removing from its surface by shearing upstanding threads thereon, it being understood that the cloth A is drawn over the support 1 while the shearing is proceeding. The support may be mounted in any way in a frame 2. Opposite the channel of the support 1 is journaled in suitable bearing means on the frame 2 the rotary cutter 3, the peripheral cutting edges of which are indicated at $3^a$, and cooperate with the ledger blade 5 in the known way and as will appear.

Suitably mounted, also in frame 2, is the nozzle, generally designated by the reference character 4. This nozzle has its intake opening or mouth elongated lengthwise of the cutter and at one long side or lip of such mouth is the ledger blade 5, as usual, the ledger blade projecting from the nozzle in a plane which is tangential to the cylindrical path in which the cutting edges $3^a$ of the cutter travel. In these mechanisms the object is to cause outside air to pass into the nozzle between the cutter and the ledger blade so as to remove from the cutting region and thereupon convey away the fluff or cuttings, and to this end the suction is calculated to act to best effect if air is otherwise excluded, to which end the long side of the nozzle mouth opposite the lip formed by the ledger blade is placed close to the cylindrical path of the cutter edges $3^a$ and affords a surface, as 6, conforming with or paralleling said path to more or less extent, whereby air impelled outwardly and against such side of the nozzle mouth by the cutter blades will serve to resist the inflow of atmospheric air and the consequent reduction of suction at the cutting point. With this in view I construct the nozzle in the following novel way: The body 7 of the nozzle has the form of a cone, flattened, thus producing the mentioned elongated mouth $7^a$; its outlet end is tubular or substantially so, as at 8. (In practice the nozzle and ledger blade are separate parts secured together by screws as 9, and for the attachment of the blade to the nozzle in proper position the edge portion of the nozzle at its mouth is thickened up, as at $7^b$, and provided with a flat exterior surface against which the blade bears.) At the side of the nozzle mouth $7^a$ opposite the ledger blade wall $7^c$ of nozzle body 7 approaches quite close to the cylindrical path in which the cutter edges $3^a$ travel, and it has as an integral projection thereof the baffle 10. This baffle projects outwardly from said wall and it has adjoining the cutter the mentioned surface 6, for more or less extent conforming with or parallel to the said cylindrical path of the cutting edges $3^a$. The baffle 10 and the opposite side of the mouth $7^a$ together form a recess in which the cutter 3 is arranged.

Thus I have constructed the nozzle for efficient exclusion of air execept at the cutting edge. But I have these further advantages: Heretofore, the part corresponding to my baffle 10 projected inwardly, or oppositely to the direction herein actually shown. In the first place, this produced a pocket in which the fluff collected, swirling around in a mass which finally grew to such dimensions as to cut off the passage through the nozzle entirely, so that the nozzle required to be removed and cleaned. Secondly, it was practically impossible to cast the nozzle when so formed so that the inner edge of the baffle would not, as a consequence of warping, be wavy, and if so it was then very difficult to machine it so that its surface 6 would be truly parallel with the cylindrical path of the cutter edges $3^a$. By forming the baffle as I have described the nozzle not only affords a passage from its mouth to its discharge end without any cavity in which swirling or eddying may be set up but that side of the mouth $7^a$ which has the surface 6 is at the critical point (i. e., where the surface 6 exists) reinforced or supported directly by the body of the nozzle, or more specifically its wall $7^c$, and in forming the nozzle casting that particular part is not distorted by warping.

Another feature of my invention consists in providing a nozzle which while having the form of a flattened cone, as already described, affords a passage which tapers downward from the neck to the mouth or inlet in any section passing through both the neck and the body which traverses the lesser width of the body portion, whereby the passage is devoid of any factor whatever tending to obstruct the material being drawn from the cutting point.

The part 11 is a flexible strip commonly used in these machines both as a guard for the cutter and to hone the cutting edges 3ª thereof; it may be attached as shown to the baffle 10 so as to depend therefrom in contact with the cutter edges 3ª.

Having thus fully described my invention what I claim and desire to secure by Letters Patent is:

In a fabric shearing machine, a suction nozzle formed as an integral casting and with a flattened conical body portion and with a neck portion in which the body portion discharges, the larger end of said body portion having an opening forming the nozzle inlet and extending approximately entirely across said body portion longitudinally of its greater width and said neck portion forming the outlet of the nozzle, one side of the body portion at one long side of said mouth having a baffle also extending across said body portion longitudinally of its greater width and projecting exteriorly therefrom in a plane acute to that of the other side and thereby forming a recess to receive a rotary cutter adapted to coact with a ledger blade to form a cutting means and having its axis substantially parallel with the long side of said mouth.

In testimony whereof I affix my signature.

ARTHUR C. MASON.